United States Patent
Doi et al.

(10) Patent No.: US 10,268,099 B2
(45) Date of Patent: Apr. 23, 2019

(54) OPTICAL MODULATOR AND OPTICAL MODULE

(71) Applicant: Fujitsu Optical Components Limited, Kawasaki-shi, Kanagawa (JP)

(72) Inventors: Masaharu Doi, Sapporo (JP); Shinji Maruyama, Sapporo (JP); Yoshinobu Kubota, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/679,672

(22) Filed: Aug. 17, 2017

(65) Prior Publication Data

US 2018/0120670 A1    May 3, 2018

(30) Foreign Application Priority Data

Oct. 31, 2016 (JP) ................ 2016-213166

(51) Int. Cl.
| | |
|---|---|
| *G02F 1/295* | (2006.01) |
| *G02F 1/313* | (2006.01) |
| *G02F 1/35* | (2006.01) |
| *G02B 6/38* | (2006.01) |
| *G06F 13/42* | (2006.01) |
| *H04B 10/556* | (2013.01) |
| *H04B 10/67* | (2013.01) |
| *H04B 10/50* | (2013.01) |

(52) U.S. Cl.
CPC .......... *G02F 1/3131* (2013.01); *G02F 1/3521* (2013.01); *G02B 6/381* (2013.01); *G06F 13/4282* (2013.01); *H04B 10/505* (2013.01); *H04B 10/556* (2013.01); *H04B 10/676* (2013.01)

(58) Field of Classification Search
CPC ........ G02F 1/025; G02F 1/0147; G02F 1/225; G02F 1/3132; G02F 1/295; G02B 6/12007
See application file for complete search history.

(56) References Cited

U.S. PATENT DOCUMENTS

| | | | |
|---|---|---|---|
| 2003/0095307 A1* | 5/2003 | Moon | G02B 6/262 398/45 |
| 2003/0095311 A1* | 5/2003 | Liu | H04J 14/08 398/98 |
| 2005/0201653 A1* | 9/2005 | Gilardi | G02F 1/0327 385/2 |
| 2014/0241659 A1 | 8/2014 | Fukuda et al. | |
| 2015/0253521 A1* | 9/2015 | Maruyama | G02B 6/4244 385/11 |

FOREIGN PATENT DOCUMENTS

JP    2014-164243    9/2014

* cited by examiner

*Primary Examiner* — Jennifer Doan
(74) *Attorney, Agent, or Firm* — Staas & Halsey LLP

(57) ABSTRACT

An optical modulator connected to a first optical fiber and a second optical fiber arranged in parallel includes an optical-path changing unit that redirects light emerging from a tip of the first optical fiber toward a tip of the second optical fiber and an optical modulation chip that modulates the light redirected by the optical-path changing unit and outputs a light beam obtained by modulating the light to a tip of the second optical fiber.

12 Claims, 5 Drawing Sheets

OPTICAL MODULATOR AND OPTICAL MODULE

CROSS-REFERENCE TO RELATED APPLICATION

This application is based upon and claims the benefit of priority of the prior Japanese Patent Application No. 2016-213166, filed on Oct. 31, 2016, the entire contents of which are incorporated herein by reference.

FIELD

The embodiments discussed herein are related to optical modulators and optical modules.

BACKGROUND

An optical modulator is typically configured such that an input optical fiber and an output optical fiber are connected to opposite sides of a package in a series connection. However, connecting an input optical fiber and an output optical fiber to opposite sides of an optical modulator increases the size of the overall optical modulator and undesirably increases an area to be occupied by the optical modulator.

Under the circumstances, some optical modulators may be configured such that an input optical fiber and an output optical fiber arranged in parallel are connected to one side of a package for reduction of an area to be occupied by the optical modulator.

In an optical modulator, to which an input optical fiber and an output optical fiber arranged in parallel are connected, direction of light travel is changed between a tip of the input optical fiber and a tip of the output optical fiber. As a technique related to such changing direction of light travel, for instance, a technique that uses a mirror and an optical modulation chip is proposed. This technique causes light emerging from the tip of the input optical fiber to be reflected by the mirror toward a side surface, which serves as an incident facet, of the optical modulation chip and performs optical modulation on the reflected light while causing the reflected light to propagate to one facet, which perpendicularly intersects the side surface, of the optical modulation chip using a bent portion of an optical waveguide on the optical modulation chip. A light beam resulting from the optical modulation is output from the one facet, which serves as an exit facet, of the optical modulation chip to the tip of the output optical fiber.

Patent Document 1: Japanese Laid-open Patent Publication No. 2014-164243

An electro-optic crystal, such as lithium niobate ($LiNbO_3$), is applied to an optical modulator chip in some cases. It is known that, in an optical modulation chip to which an electro-optic crystal is applied, if an optical waveguide on the optical modulation chip has a bent portion having a small refractive index, light will leak from this bent portion due to the small difference in refractive index between the optical waveguide on the optical modulation chip and the electro-optic crystal. Specifically, when light reflected from a mirror is caused to propagate to one facet that perpendicularly intersects a side surface of the optical modulation chip using the bent portion of the optical waveguide on the optical modulation chip, changing direction of light travel causes a problem of increase in loss.

SUMMARY

According to an aspect of an embodiment, an optical modulator connected to a first optical fiber and a second optical fiber arranged in parallel includes an optical-path changing unit that redirects light emerging from a tip of the first optical fiber toward a tip of the second optical fiber; and an optical modulation chip that modulates the light redirected by the optical-path changing unit and outputs a light beam obtained by modulating the light to the tip of the second optical fiber.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The embodiments are not intended to limit the disclosed technology in any way.

[a] First Embodiment

Figure 1:
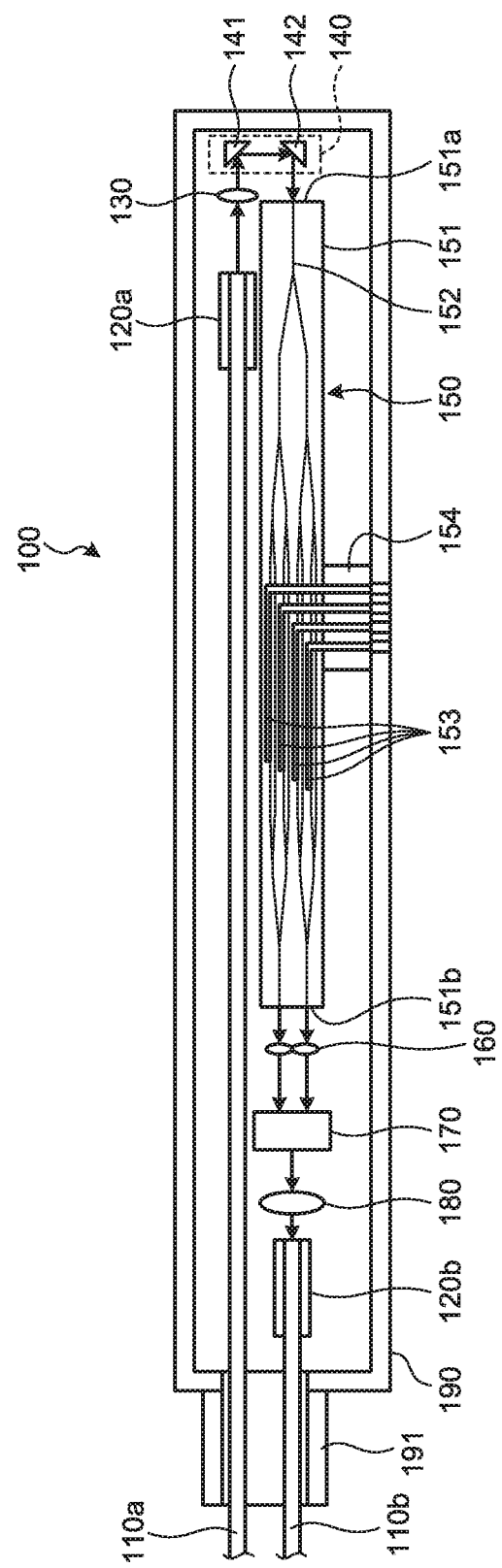
FIG. 1 is a diagram illustrating an example configuration of an optical modulator according to a first embodiment.

FIG. 1 is a diagram illustrating an example configuration of an optical modulator 100 according to a first embodiment. The optical modulator 100 illustrated in FIG. 1 is connected to optical fibers 110a and 110b arranged in parallel. The optical modulator 100 includes ferrules 120a and 120b, a lens 130, an optical-path changing unit 140, an optical modulation chip 150, a relay board 154, lens group 160, a polarization beam combiner 170, a lens 180, and a package 190.

The ferrules 120a and 120b accommodate tips of the optical fibers 110a and 110b, respectively, and fix the positions of the optical fibers 110a and 110b. The optical modulator 100 illustrated in FIG. 1 receives input of signal light from the optical fiber 110a and the ferrule 120a and outputs the signal light from the ferrule 120b and the optical fiber 110b.

The lens 130 converts signal light emerging from the tip of the optical fiber 110a accommodated in the ferrule 120a into parallel light and inputs a resultant light beam to the optical-path changing unit 140.

The optical-path changing unit 140 redirects the light beam input from the lens 130 toward the tip of the optical fiber 110b accommodated in the ferrule 120b. Specifically, the optical-path changing unit 140 includes a first prism 141 and a second prism 142. The first prism 141 reflects the light beam input from the lens 130 to thereby rotate the traveling direction of the light beam 90 degrees. The second prism 142 reflects the light beam whose traveling direction has been rotated 90 degrees by the first prism 141 to thereby rotate the traveling direction of the light beam 90 degrees. The first prism 141 and the second prism 142 thus rotate the traveling direction of the light beam 180 degrees in total, thereby redirecting the light beam input from the lens 130 toward the tip of the optical fiber 110b accommodated in the ferrule 120b.

The optical modulation chip 150 modulates the light beam redirected by the optical-path changing unit 140. The optical modulation chip 150 outputs a light beam resulting from the optical modulation to the tip of the optical fiber 110b accommodated in the ferrule 120b through the lens group 160, the polarization beam combiner 170, and the lens 180. Specifically, the optical modulation chip 150 includes a substrate 151, an optical waveguide 152, and signal electrodes 153.

The substrate 151 is a crystal substrate that uses an electro-optic crystal, such as lithium niobate ($LiNbO_3$ (LN)). A facet 151a of the substrate 151 faces the optical-path changing unit 140.

The optical waveguide 152 is formed by forming a layer of metal, such as titanium (Ti), on a portion of the substrate 151 and thermally diffusing the metal. The optical waveguide 152 performs optical modulation on the light beam redirected by the optical-path changing unit 140 in accordance with an electrical signal fed to the signal electrodes 153 while causing the light beam to propagate from the facet 151a of the substrate 151 to a facet 151b, which is on the side opposite from the facet 151a, along a longitudinal direction of the substrate 151. The optical waveguide 152 outputs a light beam resulting from the optical modulation from the facet 151b of the substrate 151 toward the tip of the optical fiber 110b accommodated in the ferrule 120b. In the example of FIG. 1, the optical waveguide 152 splits the light beam redirected by the optical-path changing unit 140 into two light beams, performs optical modulation on each of the light beams while causing the light beams to propagate to the facet 151b of the substrate 151, and outputs two light beams resulting from the optical modulation from the facet 151b of the substrate 151.

The signal electrodes 153 are coplanar waveguides formed along the optical waveguide 152. In the example of FIG. 1, the optical waveguide 152 includes four pairs of parallel Mach-Zehnder waveguides; accordingly, the signal electrodes 153 are formed in a one-to-one correspondence with the Mach-Zehnder waveguides. Each of the signal electrodes 153 may be, for instance, patterned on a corresponding one of the Mach-Zehnder waveguides. A buffer layer is provided between the substrate 151 and the signal electrodes 153 to prevent light propagating through the optical waveguide 152 from being absorbed by the signal electrodes 153. As the buffer layer, for instance, silicon dioxide ($SiO_2$) that is approximately from 0.2 micrometers to 2 micrometers in thickness can be used.

The relay board 154 relays an electrical signal that is externally input to the optical modulator 100 to the optical modulator chip 150 and inputs the electrical signal to the signal electrodes 153 of the optical modulator chip 150.

The lens group 160, which is made up of two collimating lenses, converts each of the two light beams output from the optical modulation chip 150 into parallel light and outputs the parallel light toward the polarization beam combiner 170. Hence, the lens group 160 outputs the two light beams that travel side by side to the polarization beam combiner 170. The two light beams output from the lens group 160 are identical in polarization direction.

The polarization beam combiner 170 combines the two light beams output from the lens group 160 and outputs a light beam containing two polarizations whose polarization directions are orthogonal to each other. Specifically, the polarization beam combiner 170 rotates the polarization direction of one of the light beams output from the lens group 160, thereafter combines the one light beam with the other light beam, and outputs a resultant single light beam.

The lens 180 irradiates the tip of the optical fiber 110b accommodated in the ferrule 120b with the light beam output from the polarization beam combiner 170.

The package 190 houses the ferrules 120a and 120b, the lens 130, the optical-path changing unit 140, the optical modulation chip 150, the lens group 160, the polarization beam combiner 170, and the relay board 154. A through passage 191 is formed through a side wall on one side of the package 190. The through passage 191 is made up of, for instance, a through hole passing through the side wall of the package 190 and a tube-like portion (pipe) connected to the through hole. The ferrule 120a and the ferrule 120b are housed in the package 190 by being inserted inside the package 190 through the through passage 191. With the ferrule 120a and the ferrule 120b inserted inside the package 190, the through passage 191 is sealed with solder to render the package 190 airtight.

As described above, according to the first embodiment, light coming from the tip of the optical fiber, which is one of the two parallel optical fibers, is redirected by the optical-path changing unit toward the tip of the other optical fiber and thereafter optically modulated by the optical modulation chip; a light beam resulting from the optical modulation is output to the tip of the other optical fiber. Hence, changing direction of light travel between the tips of the two parallel optical fibers can be achieved without providing a bent portion in the optical waveguide on the optical modulation chip. Thus, even when an electro-optic crystal, such as lithium niobate ($LiNbO_3$), is applied to the optical modulation chip, light will not leak from the optical waveguide on the optical modulation chip and, consequently, loss caused by changing direction of light travel can be reduced.

[b] Second Embodiment

A feature of a second embodiment lies in that light coming from a tip of an optical fiber, which is one of two parallel optical fibers, is modulated by an optical modulation chip; thereafter, a light beam output from the optical modulation chip is redirected toward a tip of the other optical fiber.

Figure 2:
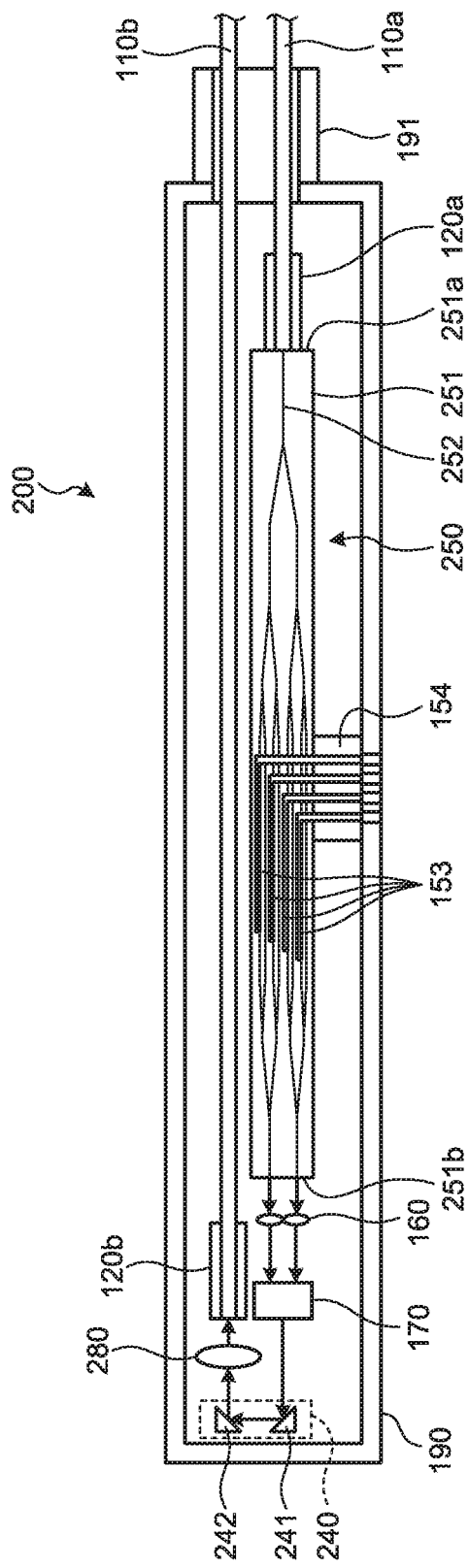
FIG. 2 is a diagram illustrating an example configuration of an optical modulator according to a second embodiment.

FIG. 2 is a diagram illustrating an example configuration of an optical modulator 200 according to the second embodiment. In FIG. 2, elements identical to those of FIG. 1 are denoted by identical reference numerals, and repeated description is omitted. The optical modulator 200 illustrated in FIG. 2 includes the ferrules 120a and 120b, an optical modulation chip 250, the relay board 154, the lens group 160, the polarization beam combiner 170, an optical-path changing unit 240, a lens 280, and the package 190.

The optical modulation chip 250 modulates signal light emerging from the tip of the optical fiber 110a accommodated in the ferrule 120a. The optical modulation chip 250 outputs a light beam resulting from the optical modulation. Specifically, the optical modulation chip 250 includes a substrate 251, an optical waveguide 252, and the signal electrodes 153.

The substrate 251 basically corresponds to the substrate 151 illustrated in FIG. 1. A facet 251a of the substrate 251 faces the tip of the optical fiber 110a accommodated in the ferrule 120a. With a facet of the optical waveguide 252 on the side of the facet 251a of the substrate 251 coupled to the tip of the optical fiber 110a accommodated in the ferrule 120a, the ferrule 120a is fixed to the facet 251a of the substrate 251. Hence, optical coupling between the facet of the optical waveguide 252 on the side of the facet 251a of the substrate 251 and the tip of the optical fiber 110a accommodated in the ferrule 120a can be achieved without using an optical component, such as a lens.

The optical waveguide 252 basically corresponds to the optical waveguide 152 illustrated in FIG. 1. The optical waveguide 252 performs optical modulation on the signal light emerging from the tip of the optical fiber 110a in accordance with an electrical signal fed to the signal electrodes 153 while causing the signal light to propagate from the facet 251a of the substrate 251 to a facet 251b, which is on the side opposite from the facet 251a, along a longitudinal direction of the substrate 251. The optical waveguide 252 outputs a light beam resulting from the optical modulation from the facet 251b of the substrate 251 to the optical-path changing unit 240 through the lens group 160 and the polarization beam combiner 170. In the example of FIG. 2, the optical waveguide 252 splits the signal light emerging from the tip of the optical fiber 110a into two light beams, performs optical modulation on each of the light beams while causing the light beams to propagate to the facet 251b of the substrate 251, and outputs two light beams resulting from the optical modulation from the facet 251b of the substrate 251.

The optical-path changing unit 240 redirects a light beam output from the polarization beam combiner 170 toward the tip of the optical fiber 110b accommodated in the ferrule 120b. Specifically, the optical-path changing unit 240 includes a first prism 241 and a second prism 242. The first prism 241 reflects the light beam output from the polarization beam combiner 170 to thereby rotate the traveling direction of the light beam 90 degrees. The second prism 242 reflects the light beam whose traveling direction has been rotated 90 degrees by the first prism 241 to thereby rotate the traveling direction of the light beam 90 degrees. The first prism 241 and the second prism 242 thus rotate the traveling direction of the light beam 180 degrees in total, thereby redirecting the light beam output from the polarization beam combiner 170 toward the tip of the optical fiber 110b accommodated in the ferrule 120b.

The lens 280 irradiates the tip of the optical fiber 110b accommodated in the ferrule 120b with the light beam redirected by the optical-path changing unit 240.

As described above, according to the second embodiment, light coming from the tap of the optical fiber, which is one of the two parallel optical fibers, is modulated by the optical modulation chip; thereafter, a light beam output from the optical modulation chip is redirected toward the tip of the other optical fiber by the optical-path changing unit. Hence, changing direction of light travel between the tips of the two parallel optical fibers can be achieved without providing a bent portion in the optical waveguide on the optical modulation chip. Thus, even when an electro-optic crystal, such as lithium niobate ($LiNbO_3$), is applied to the optical modulation chip, light will not leak from the optical waveguide on the optical modulation chip and, consequently, loss caused by changing direction of light travel can be reduced.

Furthermore, according to the second embodiment, the ferrule that accommodates the tip of the one of the optical fibers can be directly fixed to the facet of the optical modulation chip (substrate), and hence an optical component for optically coupling between the facet of the optical waveguide on the side of the facet of the substrate and the tip of the optical fiber accommodated in the ferrule is omitted.

[c] Third Embodiment

A feature of a third embodiment lies in that a ferrule that accommodates a tip of the optical fiber, which is one of two parallel optical fibers, and a ferrule that accommodates a tip of the other optical fiber are integrally formed into a single component.

Figure 3:
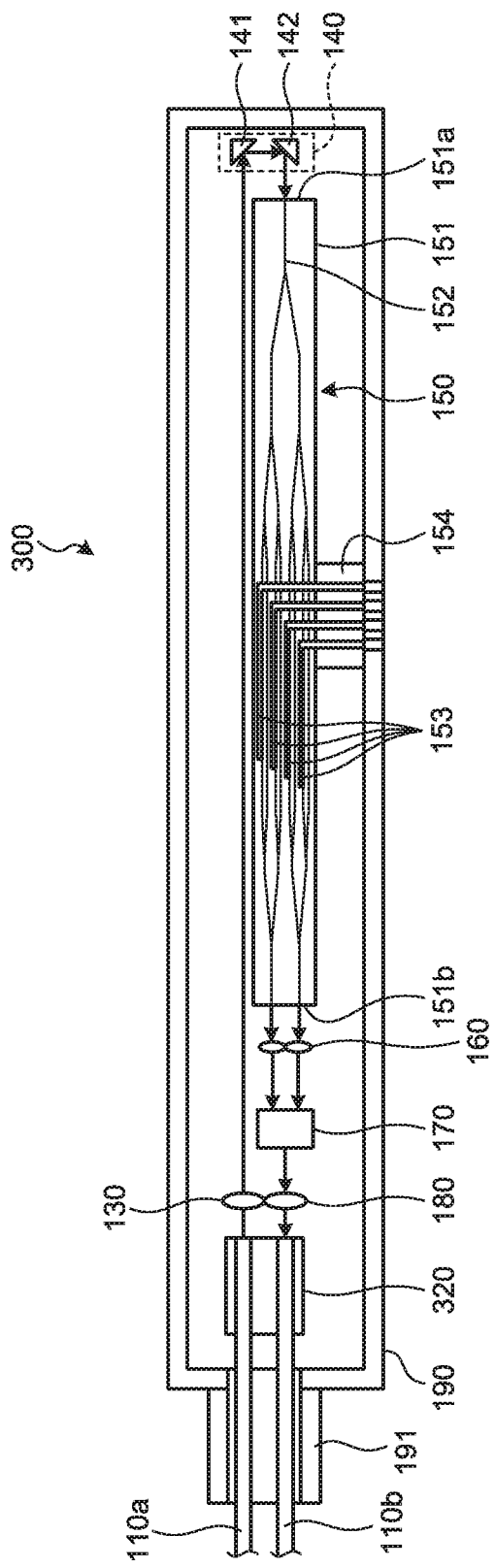
FIG. 3 is a diagram illustrating an example configuration of an optical modulator according to a third embodiment.

FIG. 3 is a diagram illustrating an example configuration of an optical modulator 300 according to the third embodiment. In FIG. 3, elements identical to those of FIG. 1 are denoted by identical reference numerals, and repeated description is omitted. The optical modulator 300 illustrated in FIG. 3 includes a ferrule 320, the lens 130, the optical-path changing unit 140, the optical modulation chip 150, the relay board 154, the lens group 160, the polarization beam combiner 170, the lens 180, and the package 190.

The ferrule 320 is a component obtained by integrally forming the ferrule 120a and the ferrule 120b illustrated in FIG. 1 as a single component. Specifically, the ferrule 320 accommodates the tips of the optical fibers 110a and 110b and fixes the positions of the optical fibers 110a and 110b at a same position in a longitudinal direction of the substrate 151.

As described above, according to the third embodiment, even when the distance between the optical fibers 110a and 110b arranged in parallel is reduced, the tips of the optical fibers 110a and 110b can be accommodated in the single ferrule 320. Hence, reduction in size of the ferrule 320 and reduction in size of the through passage 191, through which the ferrule 320 is inserted, of the package 190 can achieved. This allows sealing the through passage 191 with solder more reliably and increasing airtightness of the package 190.

In the first embodiment described above, an example where the ferrule 120a and the ferrule 120b are housed in the package 190 by being inserted inside the package 190 through the through passage 191 of the package 190 has been presented. Alternatively, the ferrule 120a and the ferrule 120b may be housed in the package 190 by being inserted inside the package 190 through two through passages of the package 190.

Figure 4:
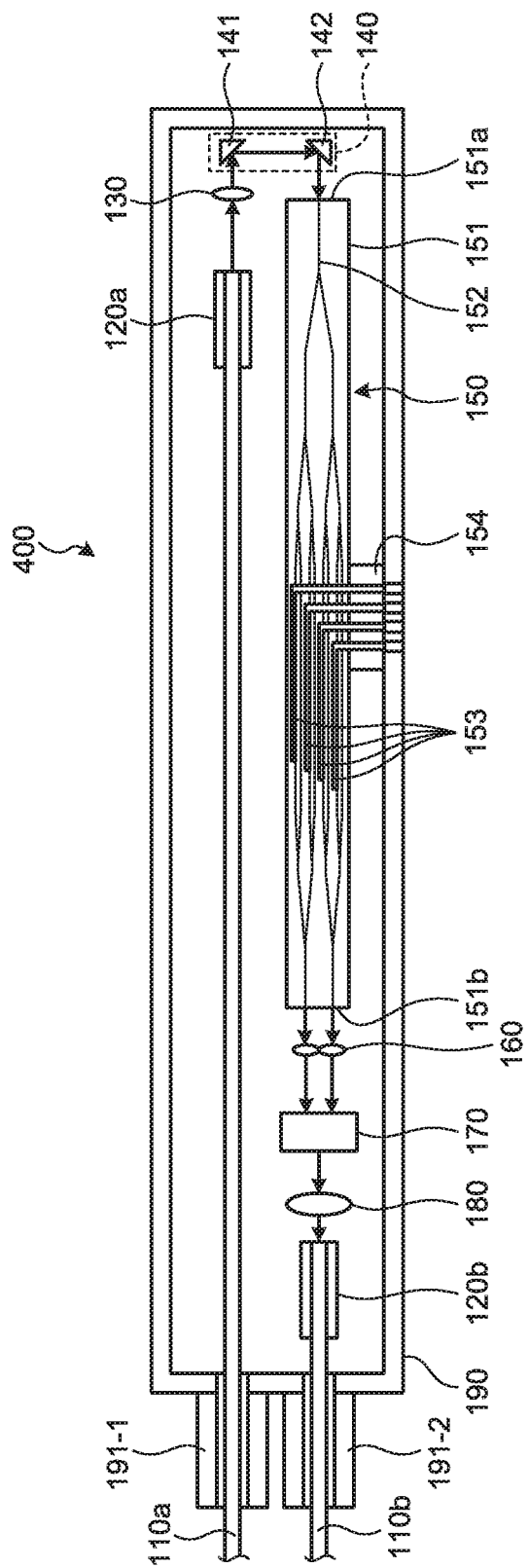
FIG. 4 is a diagram illustrating an example configuration of an optical modulator according to an example modification.

FIG. 4 is a diagram illustrating an example configuration of an optical modulator 400 according to an example modification. In FIG. 4, elements identical to those of FIG. 1 are denoted by identical reference numerals, and repeated description is omitted. In the optical modulator 400 illustrated in FIG. 4, through passages 191-1 and 191-2 are formed through a side wall on one side of the package 190. Each of the through passages 191-1 and 191-2 is made up of, for instance, a through hole passing through the side wall of the package 190 and a tube-like portion (pipe) connected to the through hole. The ferrule 120a is housed in the package 190 by being inserted inside the package 190 through the through passage 191-1. With the ferrule 120a inserted inside the package 190, the through passage 191-1 is sealed with solder to render the package 190 airtight. The ferrule 120b is housed in the package 190 by being inserted inside the package 190 through the through passage 191-2. With the ferrule 120b inserted inside the package 190, the through passage 191-2 is sealed with solder to render the package 190 airtight. The above-described structure allows reduction in size of each of the through passages 191-1 and 191-2 of the package 190. This allows sealing the through passages 191-1 and 191-2 with solder more reliably and increasing airtightness of the package 190.

Figure 5:
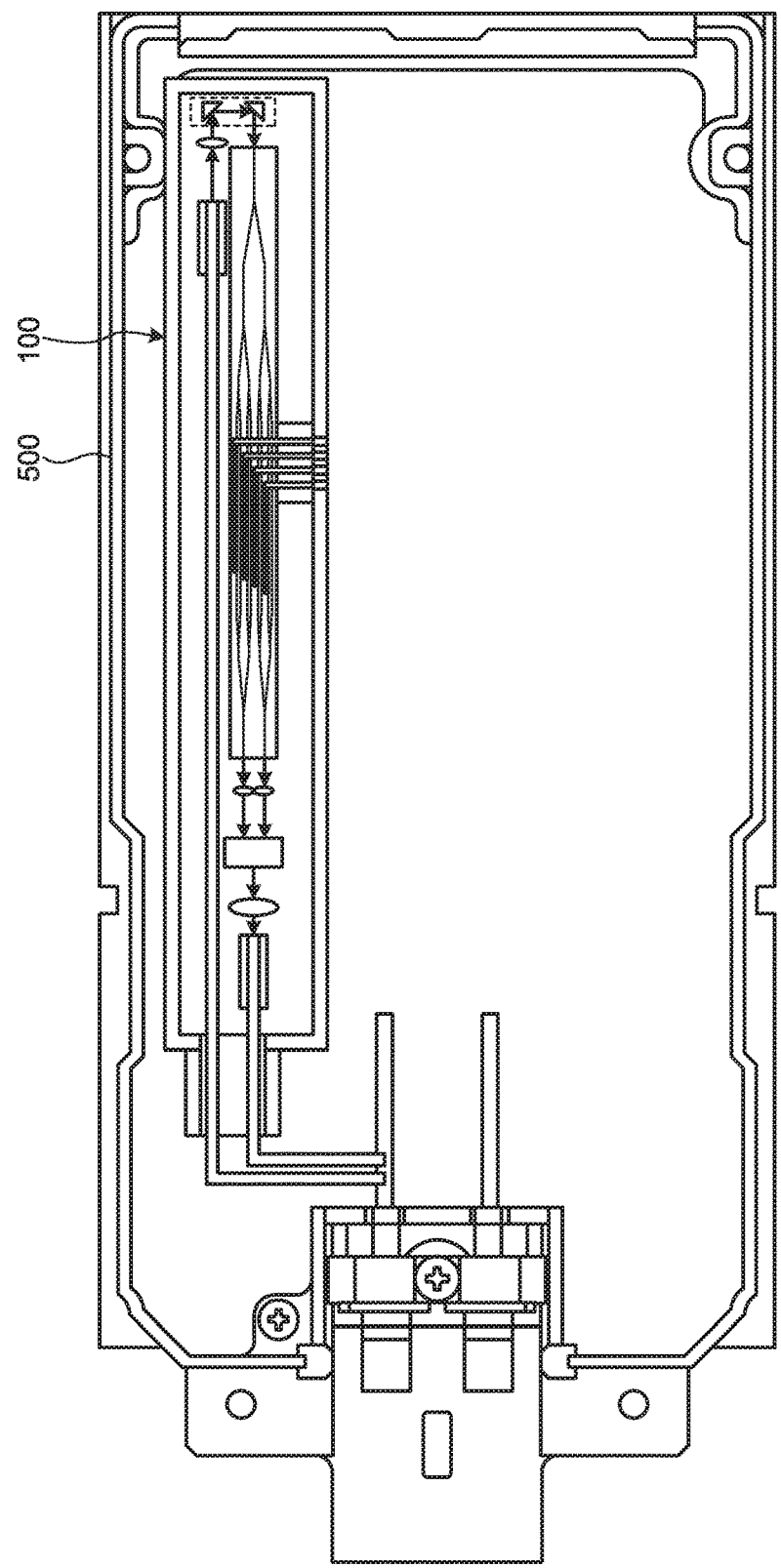
FIG. 5 is a diagram illustrating an example configuration of an optical module.

The optical modulator 100, 200, 300, 400 described in the embodiments and the example modification can be placed in an optical module, such as a transceiver apparatus that transmits and receives light signals, for instance. FIG. 5 is a diagram illustrating an example configuration of an optical module 500 configured as such. As illustrated in FIG. 5, the optical modulator 100 is placed inside the optical module 500.

As described in the first embodiment above, the optical modulator 100 redirects light coming from the tip of the optical fiber, which is one of the two parallel optical fibers and, thereafter, optically modulates the light and outputs a resultant light beam to the tip of the other optical fiber. Hence, loss caused by changing direction of light travel is reduced, and the optical module 500 can transmit and receive light signals efficiently.

Although an example where the first prism and the second prism are used as the optical-path changing unit has been presented in the embodiments described above, alternatively, a corner cube prism or the like may be used as the optical-path changing unit.

According to an aspect of the present disclosure, an optical modulator can reduce loss caused by changing direction of light travel.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulator connected to a first optical fiber and a second optical fiber arranged in parallel, the optical modulator comprising:
    an optical-path changing unit that redirects light emerging from a tip of the first optical fiber toward a tip of the second optical fiber; and
    an optical modulation chip that is disposed on an extended line of the tip of the second optical fiber not to cross an extended line of the tip of the first optical fiber, modulates the light redirected by the optical-path changing unit, and outputs a light beam obtained by modulating the light to the tip of the second optical fiber.

2. The optical modulator according to claim 1, wherein the optical modulation chip includes
    a substrate having a first facet that faces the optical-path changing unit, and
    an optical waveguide formed on the substrate, wherein the optical waveguide modulates the light redirected by the optical-path changing unit while causing the light to propagate from the first facet of the substrate to a second facet on a side opposite from the first facet along a longitudinal direction of the substrate and outputs the light beam obtained by modulating the light from the second facet to the tip of the second optical fiber.

3. The optical modulator according to claim 1, further comprising:
    a first ferrule that accommodates the tip of the first optical fiber;
    a second ferrule that accommodates the tip of the second optical fiber; and
    a package that houses the optical modulation chip, the optical-path changing unit, the first ferrule, and the second ferrule.

4. The optical modulator according to claim 3, wherein
    the package has, on one side of the package, a side wall having a through passage formed therethrough, and
    the first ferrule and the second ferrule are housed in the package by being inserted inside the package through the through passage.

5. The optical modulator according to claim 3, wherein the first ferrule and the second ferrule are integrally formed into a component.

6. An optical module comprising the optical modulator according to claim 1.

7. An optical modulator connected to a first optical fiber and a second optical fiber arranged in parallel, the optical modulator comprising:
    an optical modulation chip that is disposed on an extended line of the tip of the first optical fiber not to cross an extended line of the tip of the second optical fiber, modulates light emerging from a tip of the first optical fiber, and outputs a light beam obtained by modulating the light; and
    an optical-path changing unit that redirects the light beam output from the optical modulation chip toward a tip of the second optical fiber.

8. The optical modulator according to claim 7, wherein the optical modulation chip includes
    a substrate having a first facet that faces the tip of the first optical fiber, and
    an optical waveguide formed on the substrate, wherein the optical waveguide modulates the light emerging from the tip of the first optical fiber while causing the light to propagate from the first facet of the substrate to a second facet on a side opposite from the first facet along a longitudinal direction of the substrate and outputs the light beam obtained by modulating the light from the second facet to the optical-path changing unit.

9. The optical modulator according to claim 7, further comprising:
    a first ferrule that accommodates the tip of the first optical fiber;
    a second ferrule that accommodates the tip of the second optical fiber; and
    a package that houses the optical modulation chip, the optical-path changing unit, the first ferrule, and the second ferrule.

10. The optical modulator according to claim 7, wherein
    the package has, on one side of the package, a side wall having a through passage formed therethrough, and
    the first ferrule and the second ferrule are housed in the package by being inserted inside the package through the through passage.

11. The optical modulator according to claim 7, wherein the first ferrule and the second ferrule are integrally formed into a component.

12. An optical module comprising the optical modulator according to claim 7.

* * * * *